(12) United States Patent
Lewis

(10) Patent No.: US 10,207,437 B2
(45) Date of Patent: Feb. 19, 2019

(54) CLOSED CELL FOAM ARTICLE AND MANUFACTURING METHOD

(71) Applicant: Troy Lewis, Portland, OR (US)

(72) Inventor: Troy Lewis, Portland, OR (US)

( * ) Notice: Subject to any disclaimer, the term of this patent is extended or adjusted under 35 U.S.C. 154(b) by 243 days.

(21) Appl. No.: 14/975,514

(22) Filed: Dec. 18, 2015

(65) Prior Publication Data

US 2017/0173830 A1  Jun. 22, 2017

(51) Int. Cl.

| | |
|---|---|
| *B29C 45/00* | (2006.01) |
| *B29C 65/56* | (2006.01) |
| *B29C 65/00* | (2006.01) |
| *B29D 99/00* | (2010.01) |
| *A63B 37/00* | (2006.01) |
| *A63B 37/06* | (2006.01) |
| *A63B 43/00* | (2006.01) |
| *A63B 45/00* | (2006.01) |

(Continued)

(52) U.S. Cl.
CPC ............ *B29C 45/006* (2013.01); *A63B 37/00* (2013.01); *A63B 37/06* (2013.01); *A63B 43/002* (2013.01); *A63B 45/00* (2013.01); *B29C 45/0001* (2013.01); *B29C 65/565* (2013.01); *B29C 66/1122* (2013.01); *B29C 66/545* (2013.01); *B29C 66/71* (2013.01); *B29C 66/727* (2013.01); *B29D 99/0042* (2013.01); *A63B 37/0074* (2013.01); *A63B 2037/065* (2013.01); *A63B 2209/14* (2013.01); *B29C 44/08* (2013.01); *B29C 44/42* (2013.01); *B29K 2023/083* (2013.01); *B29K 2105/046* (2013.01); *B29K 2105/048* (2013.01); *B29K 2105/24* (2013.01); *B29K 2105/251* (2013.01); *B29K 2223/083* (2013.01); *B29K 2995/0021* (2013.01); *B29K 2995/0063* (2013.01); *B29L 2031/54* (2013.01)

(58) Field of Classification Search
CPC . B29C 45/006; B29C 65/565; B29C 45/0001; B29C 66/727; A63B 37/0098; A63B 69/002; A63B 45/00; A63B 39/00; A63B 37/10; A63B 37/02; A63B 37/0074; A63B 37/0066; A63B 2037/065; B29K 2623/083; B29K 2995/0063; B29K 2023/083; B29K 2105/046; B60B 5/02; A61H 2015/0014
See application file for complete search history.

(56) References Cited

U.S. PATENT DOCUMENTS

| | | | | |
|---|---|---|---|---|
| 2,994,327 A | * | 8/1961 | Otto ..................... | B29C 44/22 132/245 |
| 3,419,268 A | * | 12/1968 | Bellet ................... | A61H 15/00 482/132 |

(Continued)

*Primary Examiner* — Jacob J Cigna
(74) *Attorney, Agent, or Firm* — Baumgartner Patent Law; Marc Baumgartner

(57) ABSTRACT

Closed cell foam articles, such as sports balls, and related manufacturing methods are disclosed herein. The article includes a main body made of closed-cell elastomeric resin foam having a density ranging between about 0.050 sg and about 0.800 sg after curing. Some articles are assembled by inserting a cured core into a main body so that the core is secured in the main body via an interference fit, and the core has one or more portions extending to the exterior surface of the main body such that the an exposed surface of the one or more exposed portions of the core blend substantially with the exterior surface of the main body.

3 Claims, 6 Drawing Sheets

(51) Int. Cl.
  *B29K 23/00*   (2006.01)
  *B29L 31/54*   (2006.01)
  *B29K 105/04*  (2006.01)
  *B29K 223/00*  (2006.01)
  *B29C 44/08*   (2006.01)
  *B29C 44/42*   (2006.01)
  *B29K 105/00*  (2006.01)
  *B29K 105/24*  (2006.01)

(56) References Cited

U.S. PATENT DOCUMENTS

| | | | | |
|---|---|---|---|---|
| 5,123,645 A * | 6/1992 | MacDonald | | A63B 43/002 |
| | | | | 273/DIG. 20 |
| 5,150,906 A * | 9/1992 | Molitor | | A63B 37/0003 |
| | | | | 156/145 |
| 5,609,953 A * | 3/1997 | Tamura | | B29C 33/123 |
| | | | | 264/278 |
| 5,833,897 A * | 11/1998 | Grimm | | A63B 45/00 |
| | | | | 264/46.5 |
| 6,106,419 A * | 8/2000 | Hall | | A63B 37/00 |
| | | | | 473/594 |
| 7,300,357 B2 * | 11/2007 | Breaker | | A63B 43/002 |
| | | | | 273/DIG. 20 |
| 8,915,810 B2 * | 12/2014 | McCarthy | | A63B 39/00 |
| | | | | 473/611 |
| 8,932,160 B1 * | 1/2015 | Turner | | A63B 37/0098 |
| | | | | 473/613 |
| 9,167,228 B2 * | 10/2015 | Monari | | H04N 5/2252 |
| 2009/0131234 A1 * | 5/2009 | Dye | | A61H 15/0092 |
| | | | | 482/132 |
| 2011/0021297 A1 * | 1/2011 | McCarthy | | A63B 39/00 |
| | | | | 473/611 |
| 2012/0035029 A1 * | 2/2012 | Dye | | A61H 15/0092 |
| | | | | 482/132 |

* cited by examiner

CLOSED CELL FOAM ARTICLE AND MANUFACTURING METHOD

BACKGROUND

The present disclosure relates to closed cell foam articles, such as sports balls, and related methods for manufacturing such articles. The closed cell foam article is made by a foam injection molding technique. In particular, articles are formed of a closed cell foam material having a density ranging between about 0.050 sg and about 0.800 sg after curing. Some articles include parts that are assembled to create a substantially solid ball with good resilience and other properties mimicking an inflated ball.

Existing sports balls, such as soccer balls or footballs, are often made of an air-filled inner bladder and an outer covering. Existing solid one-piece foam balls are often made from an open cell foam, such as a polyurethane foam. Open cell foam balls, however, typically have an open cell structure, and do not bounce well, are not durable, and may absorb fluids. Another example of a one-piece ball is a solid rubber ball. The largest solid rubber balls are generally about 3 to 4 inches in diameter, and are very heavy and may be dangerous to play with due to their weight.

For certain applications, a closed cell structure is beneficial, for example because the material does not absorb fluids. Other benefits of a closed cell structure include being dirt repellent and easy to clean. This makes a closed cell foam material, such as ethylene vinyl acetate (EVA) foam, particularly suitable for many different applications.

Closed cell foam products are generally much more durable, tougher and lasting than polyurethane or rubber products. Conventionally, EVA foam products are prepared by completely filling a preheated mold with an EVA foamable composition. The foamable composition usually contains EVA resin, a foaming agent, and a cross-linking agent. Pressure is applied to the composition allowing foaming and curing of the composition to take place, i.e., decomposition of the foaming agent and the cross-linking agent, and subsequently releasing pressure to allow the EVA composition to simultaneously expand and cure.

However, the manufacturing of closed cell foam applications with the existing injection molding techniques presents problems, for example curing problems put limitations on the size and shape of the articles formed with the existing methods.

An example of a non-pressurized sports ball is described in U.S. Pat. No. 8,915,810, which is incorporated herein by reference in its entirety. The sports ball is a hollow ball made of an injection molded closed cell elastomeric resin foam. The described process has disadvantages because formation of the sports ball requires that a cap is bonded on. For some applications, such as a pet ball, the construction will not be as durable because the cap can be chewed on and come off. In a massage ball application, the non-pressurized ball cannot take the weight of a body and may deflate so that the ball can no longer function of as a massage ball.

Existing solid round EVA balls that are made by foam injection molding typically have a diameter of less than 2 inches. Because of the foam injection molding process, larger sized applications have manufacturing problems associated because the materials do not cure or harden when a wall thickness of the article is over 2 inches.

Thus, there exists a need for improved closed cell foam articles and manufacturing methods. It is desirable therefore to provide an article that can be larger than the existing closed cell foam articles, that is lightweight, and that is waterproof and more durable than existing articles of similar shape and size. Examples of manufacturing methods to make a lightweight article with the injection molded closed cell elastomeric resin foam technique are disclosed below.

SUMMARY

In some embodiments, the inventive subject matter is directed to a one-piece closed cell foam article, including a main body having an exterior surface, an interior surface defining a cavity extending to the exterior surface so that the cavity has one or more sections exposed at the exterior surface of the main body, and a body wall formed between the exterior surface and interior surface. The article is made of a cured, closed-cell elastomeric resin foam having a density ranging between about 0.050 sg and about 0.800 sg after curing. The main body has a diameter of at least about 2 inches. In some embodiments, the main body includes longitudinal indentations along the exterior surface.

In other embodiments, the inventive subject matter is directed to a closed cell foam article including a main body and a core. The main body has an exterior surface and an interior surface. The interior surface defines a cavity extending to the exterior surface so that the cavity has one or more sections exposed at the exterior surface of the main body. The core is disposed in the cavity and is sized to substantially fill the cavity so that the core is secured in the main body via an interference fit. The core has one or more portions extending to the exterior surface of the main body such that an exposed surface of the one or more exposed portions of the core blends substantially with the exterior surface of the main body.

In some embodiments, the main body and/or the core is made from a cured, closed-cell elastomeric resin foam having a density ranging between about 0.050 sg and about 0.800 sg after curing. Further embodiments may also have one or more of the following features: a main body that has a substantially spherical shape, a cavity including a center of the main body, the main body having a diameter in the range of about 2 inches to about 22 inches, one or more sections of the cavity being exposed at the exterior surface of the main body having a diameter in the range of about 0.59 inches to about 6.10 inches, and the core having a cylindrical shape with a variable diameter ranging between about 0.5 inches and about 11 inches. In some embodiments, a closed cell foam sports ball is disclosed, for example wherein the main body has a football shape.

In further embodiments, the interior surface of the main body includes a concave portion and one or more portions extending to the exterior surface, and the core includes a convex portion complementing the concave portion and engaging the concave portion of the main body. For example, the core can include two exposed portions. A diameter of the core taken in a transverse plane at the center of the main body can be larger than a diameter taken in a transverse plane at the exposed portions. Furthermore, the diameters of the two exposed portions can be substantially the same.

In some embodiments, the main body and the core are made by foam injection molding of a closed cell foam material, and the main body and the core are assembled after curing by inserting the core into the main body and the core providing a self-centering interference fit. In further embodiments, the article is assembled by manually inserting the core into the main body before curing of the main body.

The inventive subject matter further contemplates a method for manufacturing a closed cell foam article. The method includes the steps of injection molding a main body having a cavity, injection molding and curing a core sized to fit and substantially fill the cavity, and assembling the article by inserting the core into the main body such that the core is secured in the main body via a self-centering interference fit, and one or more exposed portions of the core blend substantially with the exterior surface of the main body.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

Figure 2:
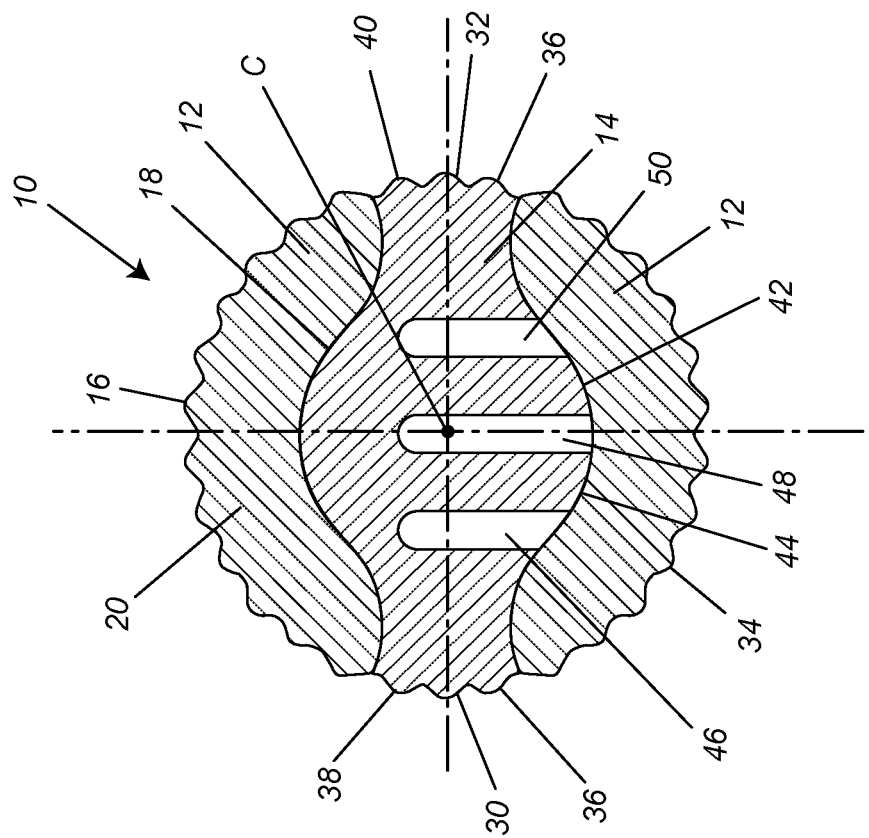
FIG. 2 is a simplified cross-sectional side view of the closed cell foam article of FIG. 1.

The disclosed articles and methods will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Representative embodiments according to the inventive subject matter are shown in FIGS. 1-13, wherein the same or generally similar features share common reference numerals.

Disclosed below are example embodiments of a closed cell foam article and related methods for manufacturing such an article. The disclosed manufacturing methods are foam injection molding methods creating closed cell elastomeric resin foam articles in different shapes and sizes.

Although in some embodiments the disclosed articles are referred to as having a substantially solid sphere, the main body or the core may include certain hollow elements. In general, the disclosed articles such as sports balls exhibit properties mimicking an inflated or similar type of ball. As such, the disclosed articles are typically lightweight, durable, have good resilience, and are easy to clean.

The term "foam injection molding" as used herein refers to a process that is different from thermoplastic injection molding, and requires different equipment. Conventional foam injection molding methods are limited in their application due to the curing that is required to form the article. For example, for larger sized articles problems arise because the elastomeric resin cannot fully cure beyond a certain diameter.

In some embodiments, structural features and shape of the article allow the material to cure fully without leading to inconsistencies in the material. In other embodiments, the incorporation of multiple parts to form a closed cell foam article wherein each part is allowed to cure fully before assembly allows forming larger sized articles. The disclosed methods allow manufacture of tough molded foam applications such as sports balls, massage balls, pet balls, and the like. The disclosed methods can also be used to create a variety of articles such as protection bumpers on furniture, floatation applications for fishing, boating and pools, plumbing applications, medical applications, and so forth.

FIGS. 1-4 show an example of a closed cell foam article with a general spherical shape as commonly used to play soccer. However, it is understood that the inventive subject matter is not limited to a spherical ball but may include articles of any shape or form.

FIGS. 1-4 show an article 10, in particular sports ball 20 including two parts, namely a main body 12 and a core 14. The parts are manufactured separately. Core 14 is adapted to be inserted and tightly held in place within the main body.

Figure 3:
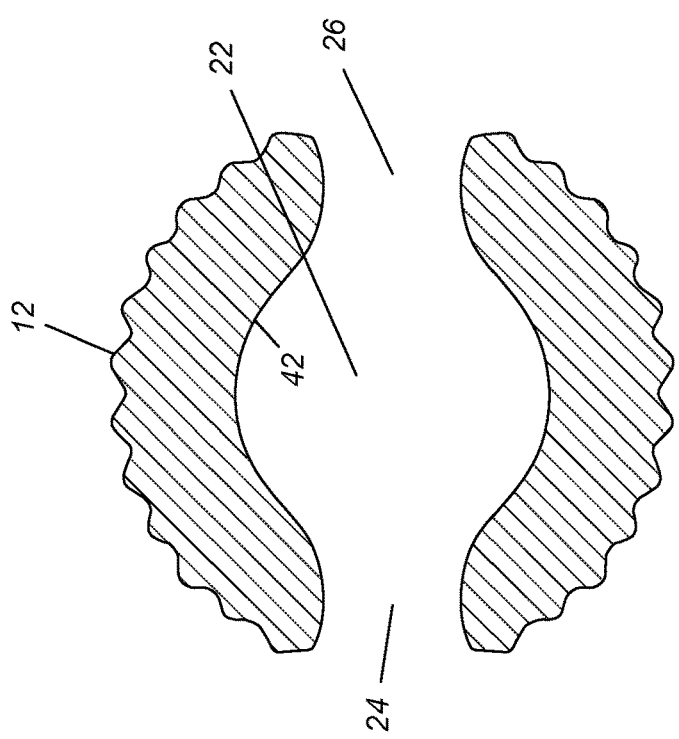
FIG. 3 is a simplified cross-sectional side view of the main body of the closed cell foam article of FIG. 1.

Main body 12 has an exterior surface 16 and an interior surface 18. Interior surface 18 defines a cavity 22, allowing the main body to have a relatively consistent wall thickness. For example, cavity 22 is formed by a concave portion 42 of interior surface 18. Sections 24, 26 extend to the exterior surface of main body 12, and as such sections 24 and 26 expose cavity 22 at the exterior surface of main body 12. FIGS. 2 and 3 show cavity 22 has an elongated opening running through a center C of main body 12, and has sections 24 and 26 at opposite ends of cavity 22.

FIG. 2 shows that core 14 is disposed in cavity 22 and is sized to substantially fill cavity 22 so that core 14 is secured to main body 12. The specific shape of core 14 and main body 12 provide an interference fit. Core 14 has an outer surface 28 contoured to complement interior surface 18 of main body 12. The shape and dimensions of core 14 are adapted to complement cavity 22 in main body 12 and engage the interior surface 18 of main body 12 such that, after assembly, the core remains in place in the main body.

Figure 4:
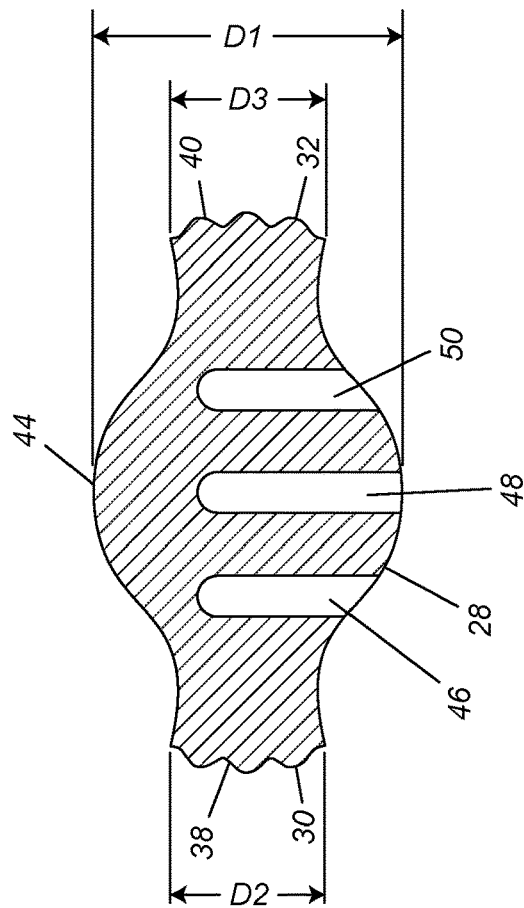
FIG. 4 is a simplified cross-sectional side view of the core of the closed cell foam article of FIG. 1.

FIG. 4 illustrates that core 14 has a generally cylindrical shape with a variable diameter taken in a transverse plane of the elongated core body. Outer surface 28 has a convex portion 44 configured to complement and engage concave portion 42 of main body 12. Core 14 has its largest diameter D1 at the convex portion 44, the diameter taken in a transverse plane of the elongated core body at a location that corresponds to the center of the main body. Exposed portions 30 and 32 have substantially the same diameters. That is, diameters D2 and D3, taken in a transverse plane of the elongated core body, are substantially the same. As can be seen in FIG. 4, diameter D1 is larger than diameters D2 and D3, resulting in an elongated cylindrical shape with a diameter that varies lengthwise and fills cavity 22. This shape holds core 14 firm in place in main body 12 via a self-centering interference fit.

Figure 1:
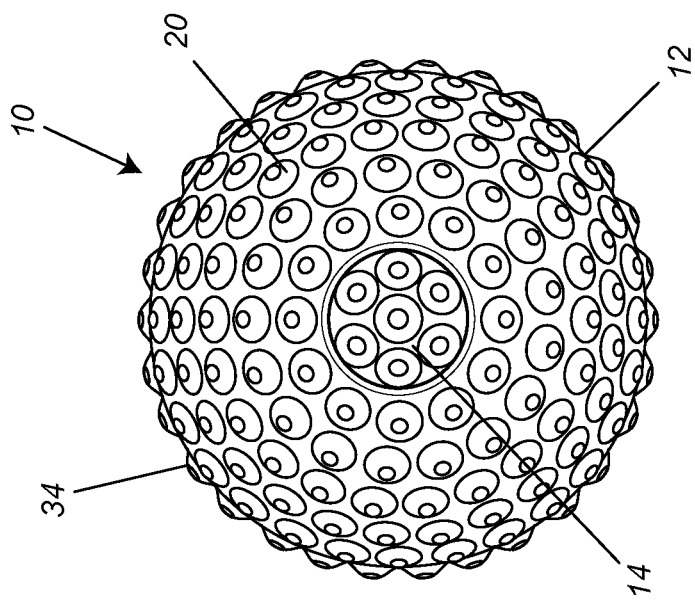
FIG. 1 is a top view of a closed cell foam article.

The article can have one or more portions of the core exposed at an exterior surface of the main body. In some embodiments, the exposed portions blend substantially with the exterior surface of the main body. For example, portions 30 and 32 extend from inner convex portion 44 towards exterior surface 16. When core 14 is positioned in cavity 22, exposed portions 30 and 32 fit within sections 24 and 26 respectively of main body 12, and exposed surfaces 38 and 40 are substantially aligned with exterior surface 16 of main body 12. As can be seen in FIG. 1, exposed portions 30 and 32 do not extend past exterior surface 16 and do not create a recess in the exterior surface either.

In some embodiments, the exposed surface of the exposed portions matches the shape and texture of the outer surface of the main body. As can be seen in FIG. 1, exterior surface 16 of main body 12 has a plurality of equidistant, dome-shaped protrusions 34, for example to provide better grip to a user of the sports ball. Exposed portions 30, 32 are also provided with protrusions, such as protrusions 36 on exposed surfaces 38 and 40. Protrusions 36 each have a shape that is substantially similar to protrusions 34. Protrusions 36 may be arranged in a pattern that completes the pattern formed by protrusions 34 such that after assembly, the pattern of protrusions 36 completes the pattern of protrusions 34 and the outer surfaces blend in with each other to form a uniform outer surface of sports ball 20.

In some embodiments, hollow elements may be formed in the core to allow uniform curing of the closed cell foam material. For example, hollow elements can be formed by the presence of heating pins in the mold and shaped by material expanding around the pins during the molding process. For example, as shown in FIG. 4, core 12 has three fingerlike hollow tunnels 46, 48, and 50, at a location where the foam material has expanded in the mold around three heating pins. Tunnels 46, 48, and 50 extend inward from outer surface 28 of core 14 in a radial direction of core 14. Tunnels 46, 48, and 50 have a predetermined length depending on a desired wall thickness for curing. The presence of the heating pins allows for a smooth curing process by providing a consistent sidewall thickness to the core.

Main body 12 and core 14 are made by foam injection molding of a closed cell foam material, and are assembled by inserting core 14 into main body 12. For example, core 14 can be molded, as explained below, prior to forming main body 12. During manufacture of main body 12, core 14 can be manually inserted into the main body and the main body will shrink around the core.

In some embodiments, main body 12 is made from a closed cell elastomeric resin foam with a density, expressed in specific gravity (sg), ranging between about 0.050 sg and about 0.800 sg after curing. In some embodiments, the core may also be made from the same material. In other embodiments, different materials may be used to make the main body and the core.

Optionally, the main body and/or the core may include additives, for example, color may be added to the foam material before curing or inserts of a same or a different material may be included.

Example dimensions of closed cell foam articles, such as sports ball 20, include a main body having a diameter in the range of about 2 inches to about 22 inches, and a core dimensioned accordingly. Suitable dimensions of a core, having a cylindrical shape with a variable diameter, include a variable diameter ranging between about 0.5 inches and about 11 inches taken along a transverse plane of the core. Example dimensions of sections of the cavity exposed at the exterior surface of the main body include a diameter in the range of about 0.59 inches to about 6.10 inches.

In further embodiments, the article can be made as a one-piece closed cell foam article having a main body only. No core or inner part is included. In some embodiments, the main body has a hollow interior, such as a cavity defined by an interior surface of the main body. The cavity allows the main body to have a relatively consistent wall thickness.

In the embodiment shown in FIGS. 6-10, the article has an elongated shape, such as a generally prolate spheroid shape of a football 220. Football 220 has a main body 230 with an interior surface 222 forming an internal cavity 224. Cavity 224 runs central in a longitudinal direction through main body 230. Cavity 224 extends to exterior surface 226 so that cavity 224 has sections 232, 234 exposed at exterior surface 226 of main body 230. A wall 236 with a uniform thickness is formed between exterior surface 226 and interior surface 222 of main body 230.

Main body 230 is made of a cured, closed-cell elastomeric resin foam having a density ranging between about 0.050 sg and about 0.800 sg after curing, for example EVA. Main body 230 has an outer diameter D4 and an inner diameter D5. Outer diameter D4 of main body 230 is at least about 2 inches. In some embodiments, the outer diameter can be up to about 22 inches. Example dimensions for such a football are an outer diameter D4 of about 4.30 inches and an inner diameter D5 of about 1.50 inches for a football having a length L of about 5.58 inches.

Figure 13:
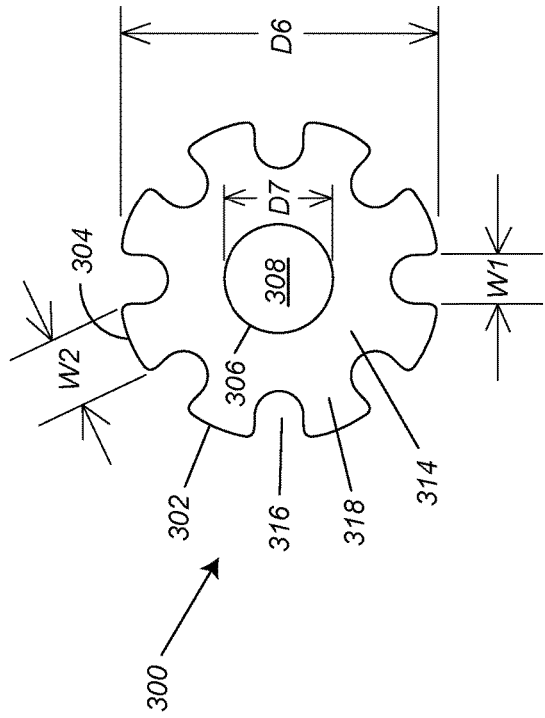
FIG. 13 is a top view of the dog ball of FIG. 11.
Figure 12:
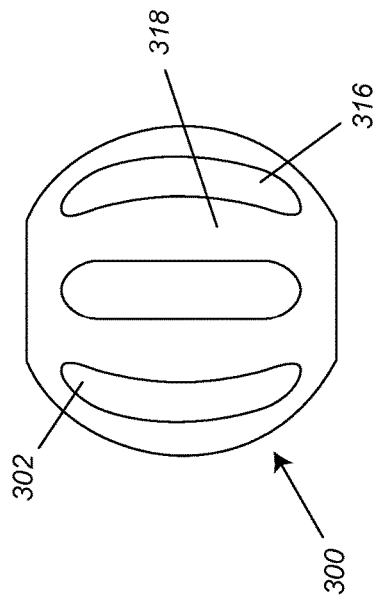
FIG. 12 is a front view of the dog ball of FIG. 11
Figure 11:
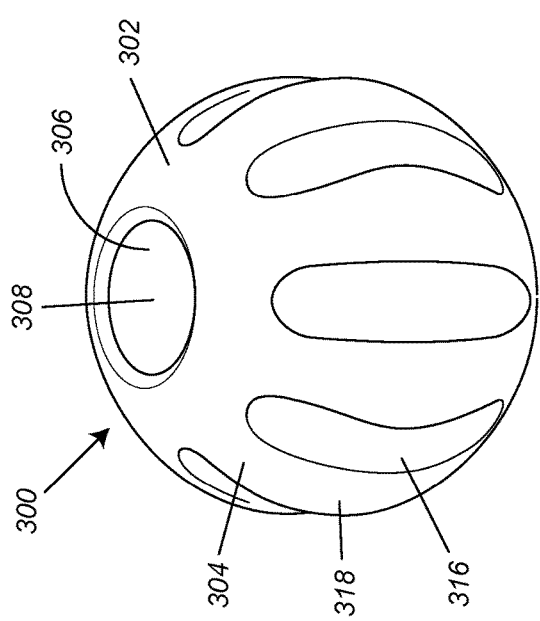
FIG. 11 is a perspective view of a dog ball according to the inventive subject matter.

In another embodiment, a one-piece article can have a generally spheroid shape with flattened poles. The article may have several longitudinal grooves or indents, as may be used to provide grip to a user or as a chew surface. FIGS. 11-13 show a ball 300 with a main body 302 and longitudinally spaced indents 316 with ridges 318 in between. Main body 302 is made in a manner substantially similar to the manner in which the main body described above is made, however no core is added and the inside of the main body is left open. Main body 302 has an exterior surface 304 and interior surface 306. Cavity 308 is defined by interior surface 306 and runs in a longitudinal direction through main body 302. Cavity 308 extends to exterior surface 304 so that cavity 308 has sections exposed at exterior surface 304 of main body 302.

Main body 302 is made of a cured, closed-cell elastomeric resin foam having a density ranging between about 0.050 sg and about 0.800 sg after curing, for example EVA. Main body 302 has an outer diameter D6 and an inner diameter D7. Outer diameter D6 of main body 302 is at least about 2 inches. In some embodiments, the outer diameter can be up to about 22 inches. A wall 314 of main body 302 is formed between exterior surface 304 and interior surface 306 such that the wall thickness allows the material to cure fully.

Example dimensions for the ball shown in FIGS. 11-13 include an outer diameter D6 of about 3.00 inches and an inner diameter D7 of about 1.00 inch. Further example dimensions include indents 316 having a width W1 at the external surface 306 of about 0.44 inches. Ridges 318 have a width W2 of about 0.64 inches at exterior surface 304.

Figure 5:
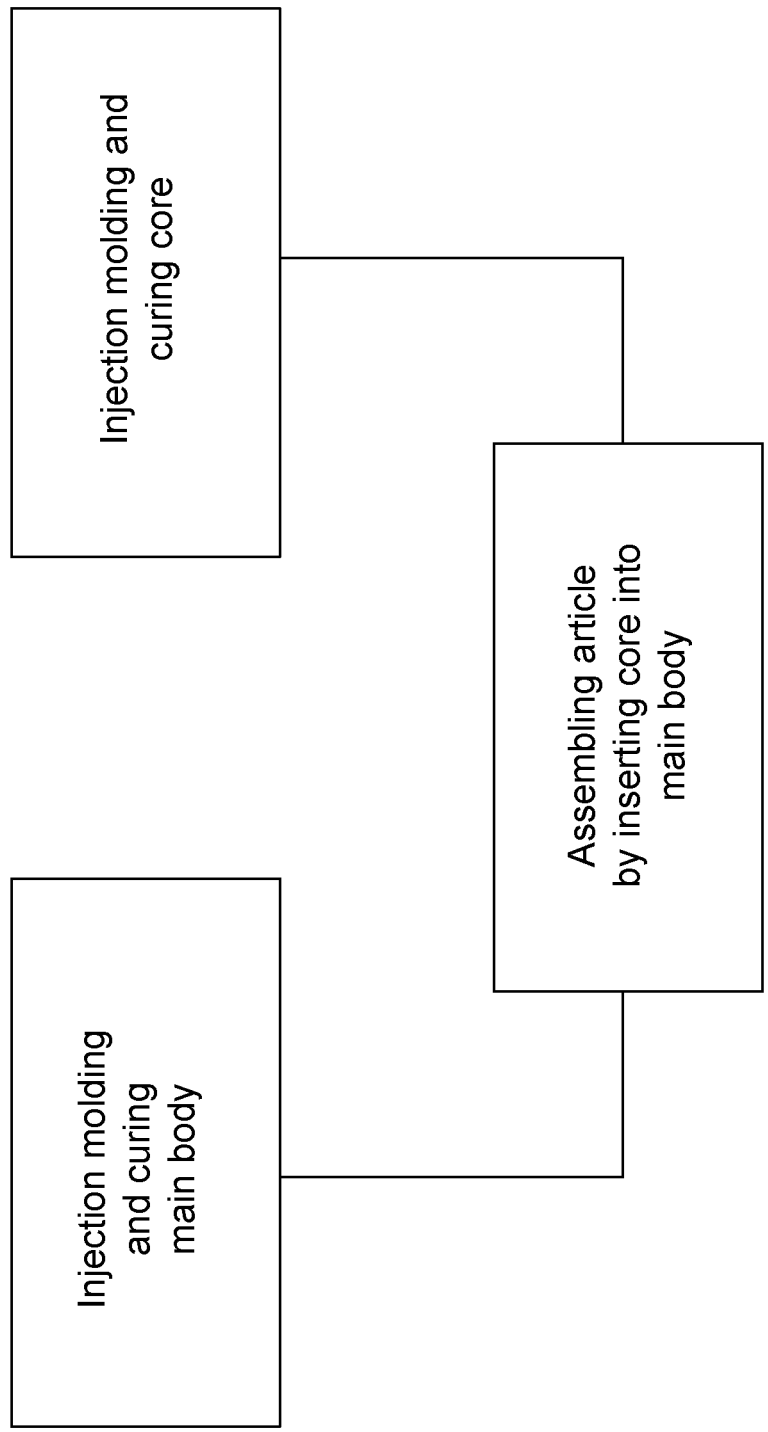
FIG. 5 is a diagram illustrating a method for manufacturing a closed cell foam article.
Figure 7:
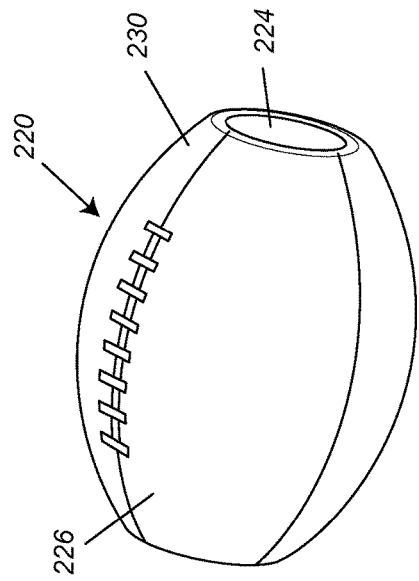
FIG. 7 is a perspective view of the football of FIG. 6.
Figure 9:
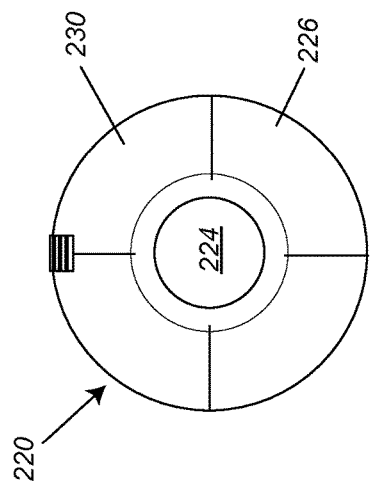
FIG. 9 is a top view of the football of FIG. 6.
Figure 6:
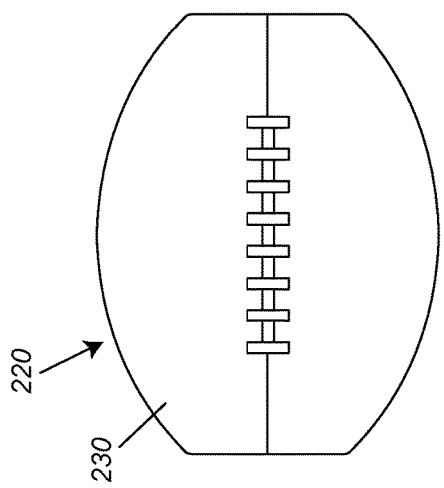
FIG. 6 is a front view of a football according to the inventive subject matter.
Figure 8:
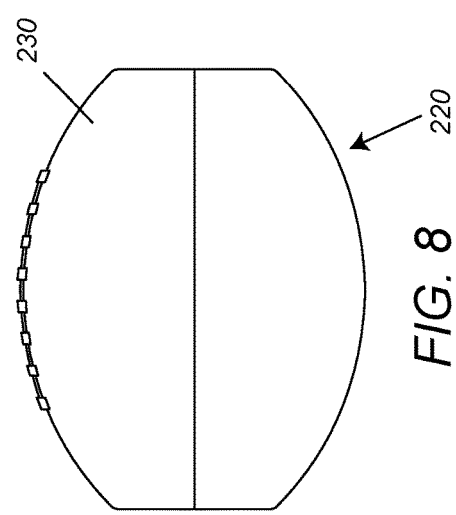
FIG. 8 is back view of the football of FIG. 6.
Figure 10:
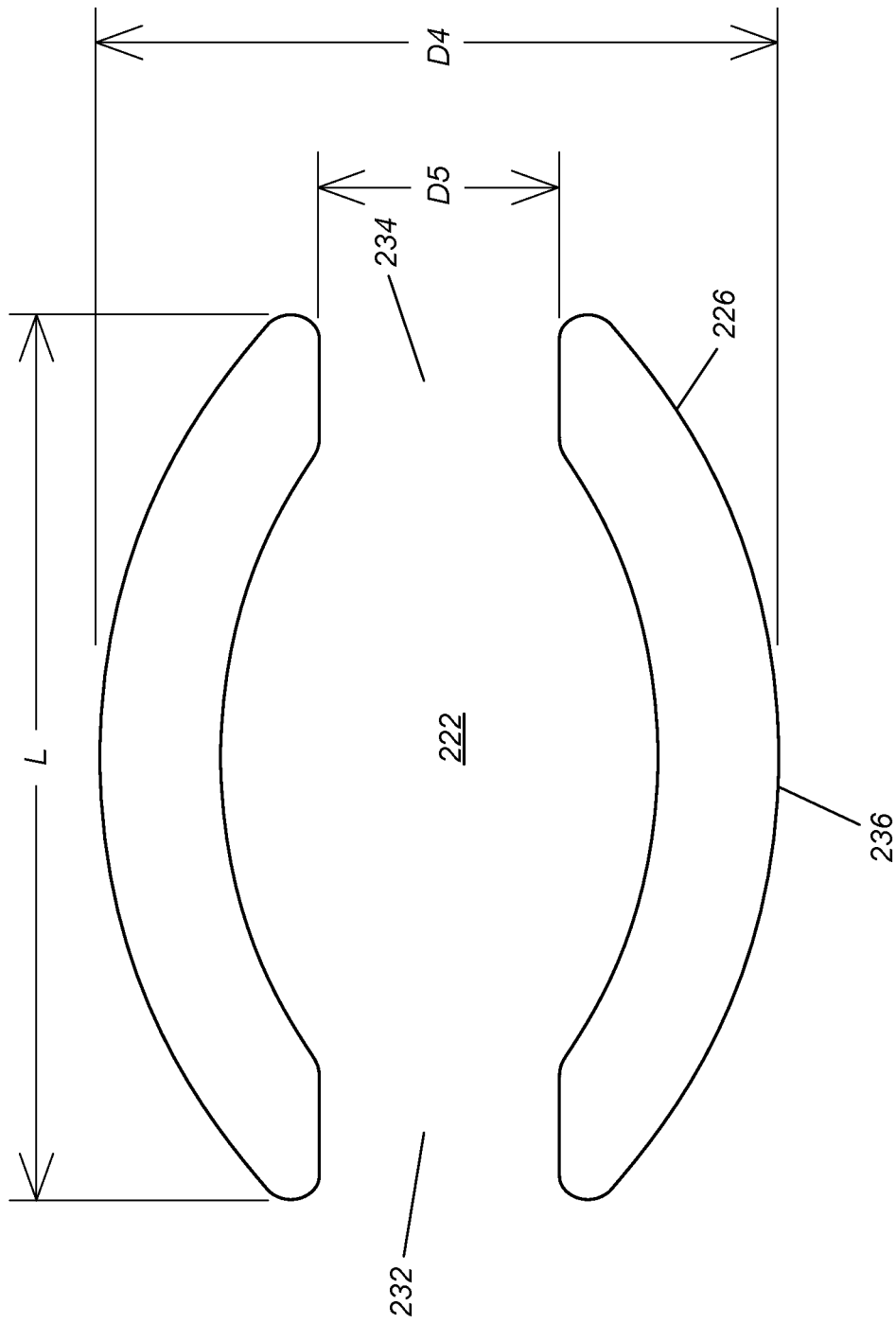
FIG. 10 is a simplified cross-sectional side view of the football of FIG. 6.

The inventive subject matter is also directed to methods for manufacturing closed cell foam articles. In some embodiments, the method includes injection molding and curing a main body, injection molding and curing a core, and assembling the article by inserting the core into the main body such that the core is secured in the main body via a self-centering interference fit. FIG. 5 shows a diagram illustrating the steps of the manufacturing method. Articles having dimensions as described above may be manufactured according to the method disclosed herein.

A foam injection molding method typically uses a foam injection molding machine. To create an EVA foam product using injection foam molding, first a granulate mixture is formed. EVA foam granules typically consist of EVA, a foaming agent and a cross-linking agent. The formed pellets are then put into a mold, usually an aluminum mold. The molds are heated and, when the part reaches a certain temperature, a catalyst is triggered causing a rapid expansion of the foam so that the parts pop out of the mold. The product is generally self-releasing. An endothermic reaction in the hot mold activates the blowing agents, resulting in an expanded foam part. This requires the mold cavity size to be smaller than the finished part. Finally, the product has to cool down and cure to the correct size.

During the foam injection manufacturing process, gas bubbles are formed with a closed cell structure. There are different kinds of EVA foam granules with different properties. Granules are available in all sorts of colors. The final product will have the color of the inserted granules. For example, in the embodiment discussed above with reference to FIGS. 1-4, the main body can be formed in one color and the core can be formed in another color. Furthermore, in some embodiments, each part may have a different hardness. For example, in the embodiment discussed above with reference to FIGS. 1-4, the main body may have one hardness and the core may have another.

When the mold is opened the material expands and pops out of the mold. The material will expand typically from about 120% to about 180% of its original in-mold size.

After the part is released from the mold some embodiments can shrink. For example, shrinkage can be about 5%. Most of it occurs the first minutes after the product is taken out of the mold but it can continue for 24 hours. Products that have strict dimensions can be placed on a shrinking mold/fixture to halt the shrinking to desired dimensions. The product will then be shaped like the shrinking mold/fixture.

In some embodiments, the cooled article may require further trimming to arrive at the finished product.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A method for manufacturing a closed cell foam article, comprising:
    injection molding and curing a main body of closed cell foam, the main body having an exterior surface and an interior surface defining a cavity extending to the exterior surface so that the cavity has one or more sections exposed at the exterior surface of the main body; and
    injection molding and curing a core of closed cell foam and sized to fit and substantially fill the cavity; and
    assembling the article by inserting the core into the main body before curing the main body such that the core is secured in the main body via a self-centering interference fit,
    and one or more exposed portions of the core align substantially with the exterior surface of the main body to form a single surface.

2. The method of claim 1, wherein the article includes a closed cell foam material having a density ranging between about 0.800 sg and about 0.050 sg after curing.

3. The method of claim 1, wherein the main body has a diameter in the range of about 2 inches to about 22 inches.

* * * * *